(12) United States Patent
Oh

(10) Patent No.: US 6,212,039 B1
(45) Date of Patent: Apr. 3, 2001

(54) DEVICE FOR SHIFTING DIRECTION MODES OF TAPE PLAYER

(75) Inventor: Ji Whan Oh, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/338,024

(22) Filed: Jun. 22, 1999

(30) Foreign Application Priority Data

Oct. 22, 1998 (KR) .................................................. 98-44243
May 12, 1999 (KR) .................................................. 99-16946

(51) Int. Cl.$^7$ .................................................. G11B 15/02
(52) U.S. Cl. .............................................................. 360/137
(58) Field of Search ............................................... 360/137

(56) References Cited

U.S. PATENT DOCUMENTS

| | | | | |
|---|---|---|---|---|
| 4,547,823 | * | 10/1985 | Ri et al. ................................ | 360/137 |
| 4,638,386 | * | 1/1987 | Takamatsu ............................ | 360/137 |
| 4,791,505 | * | 12/1988 | Takai et al. .......................... | 360/137 |
| 5,499,151 | * | 3/1996 | Lee et al. ............................. | 360/137 |
| 5,729,402 | * | 3/1998 | Chiou et al. ......................... | 360/137 |

FOREIGN PATENT DOCUMENTS 07312001   11/1995   (JP) .

* cited by examiner

*Primary Examiner*—Robert S. Tupper
(74) *Attorney, Agent, or Firm*—Renner, Otto, Boisselle & Sklar LLP

(57) ABSTRACT

A mode shifting device for an automatically reversing type tape player is disclosed. During the actuation of a shifting lever, the system can be quickly restored to the play mode after the lock release by a solenoid regardless of the normal or reverse mode, and the structure of a cam gear for shifting the modes is simplified. A cam gear 30 includes a branching cam 70 for branching the shifting path to either the first or second position so as to carry out the normal or reverse mode. Further, the branching cam 70 includes a third position for quickly shifting to the play mode, and a guide means 80 consists of a single independent cam regardless of the normal and reverse modes. Accordingly, the tape player can be shifted quickly to the play mode regardless of the normal and reverse modes. Therefore, the tape player can carry out the operation more efficiently, and the structure of the cam gear is simplified.

10 Claims, 8 Drawing Sheets

DEVICE FOR SHIFTING DIRECTION MODES OF TAPE PLAYER

BACKGROUND OF THE INVENTION

1. Field of the Invention

The present invention relates to a mode shifting device for shifting normal and reverse modes in an automatically reversing type tape player. More specifically, the present invention relates to a mode shifting device for an automatically reversing type tape player, in which during the actuation of a shifting lever, the system can be quickly restored to the play mode after the lock release by a solenoid regardless of the normal or reverse mode, and the structure of a cam gear for shifting the modes is simplified.

2. Description of the Prior Art

Generally, in the automatically reversing type tape players, a pair of capstans are mutually facingly installed at both sides of the head base. Further, a pair of pinch rolls are installed to guide the advancing of the tape in the directions of the capstans. The pinch rolls move alternately in the directions of the capstans, and thus, the advancing direction of the tape is reversed. The reproducing magnetic head rotates by being switched in accordance with the advancing direction of the tape. Here, the shifting of the modes such as normal and reverse resorts to the force of a solenoid.

A conventional mode shifting device for a tape player is disclosed in Japanese Patent Application Laid-open No. Hei-7-312001, and this device is illustrated in FIG. 1.

As schematically illustrated in FIG. 1, the mode shifting device includes: a head base 110 for carrying a magnetic head 120; a rotor 130 for being driven by a motor so as to carry the head base 110; a locking member 140 for locking the rotor 130 upon arriving of the head base 110 at a certain position; a solenoid 150 for locking and releasing the locking member 140; and a shifting member 160 for laterally moving in accordance with the actuation of the solenoid 150.

In this mode shifting device, the locking member 140 is locked and released in accordance with the actuation of the solenoid 150, while the head base 110 is carried in accordance with the revolutions of the rotor 130. Thus the normal mode is shifted to the play mode. A guide pin P of the shifting member 160 which is installed at the lower portion of the head base 110 is contacted with branching cams 132 and 134 of the rotor 130 to shift to first and second positions in accordance with the normal and reverse modes, thereby realizing a shifting. Although the drawing does not show, guide cams are disposed adjacently to the branching cam 134, for guiding the guide pin P of the shifting member 160.

Accordingly, in the above described conventional mode shifting device for the tape player, the guide pin P of the shifting member 160 is switched to the first position (normal mode) or to the second position (reverse mode) by the branching cam 134 of the rotor 130 in accordance with the actuation of the solenoid 150. During the actuation of the locking member 140 which is interlocked to the solenoid 150, the locking is released with the result that the guide pin P moves along the respective guide cams to the branch position of the branching cam 134.

However, in the above described conventional mode shifting device for the tape player, after carrying out the normal or reverse mode, the guide pin P of the shifting member 160 moves along the guide cams during the actuation of the locking member 140 which is driven by the solenoid 150. Accordingly, the guide pin P of the shifting member 160 moves a long distance, and particularly, when carrying out the reverse mode, the displacement of the guide pin P is very long. Therefore, the tape player cannot perform the mode shifting action quickly, and therefore, the guide pin P pivots continuously up to the point where the mode shifting is completed.

Further, the guide cams are separately installed for the respective normal and reverse modes, and therefore, the cam structure of the rotor 130 becomes complicated, thereby making the manufacture very difficult.

Further, the solenoid 150 and the locking member 140 which drives the guide pin P of the shifting member 160 actuate in a close contact to each other. Therefore, the load of the solenoid 150 becomes heavy, and therefore, the solenoid 150 cannot actuate efficiently, while the life expectancy of the solenoid 150 is shortened.

SUMMARY OF THE INVENTION

The present invention is intended to overcome the above described disadvantages of the conventional technique.

Therefore it is an object of the present invention to provide a mode shifting device for a tape player, in which the structure of the cam gear is simplified so as to facilitate the manufacture, and during the execution of the play mode, the play mode can be quickly shifted regardless of the normal and reverse modes, thereby making the shifting of the modes quick.

It is another object of the present invention to provide a mode shifting device for a tape player, in which the actuation load of the solenoid for driving the shifting lever is alleviated, thereby making the actuation of the solenoid efficient, and extending the life expectancy of the solenoid.

In achieving the above objects, the mode shifting device for a tape player according to the present invention includes: a head base for carrying a magnetic head; a cam gear rotatably installed for carrying the head base; a locking lever for locking the cam gear during the advancement of the head base to a certain point, so as to carrying out a mode actuation; a solenoid for intermittently driving the locking lever; a direction shifting lever for carrying out a direction reversal in accordance with intermittent actuation of the locking lever; and a guide means for branching the path of the shifting lever to a third position along a side of a branching cam so as to make the shifting lever move to first and second positions during the driving of the cam gear, whereby a quick shifting is carried out to a play mode.

In another aspect of the present invention, the mode shifting device for a tape player according to the present invention includes: a head base for carrying a magnetic head; a cam gear rotatably installed for carrying the head base; a locking lever for locking the cam gear during the advancement of the head base to a certain point, so as to carrying out a mode actuation; a solenoid for intermittently driving the locking lever; a direction shifting lever for carrying out a direction reversal in accordance with intermittent actuations of the locking lever; and at least a guide means installed at a side of a branching cam so as to make the shifting lever move to first and second positions during the driving of the cam gear, for carrying out a play mode, the guide means having a guide projection.

BRIEF DESCRIPTION OF THE DRAWINGS

The above objects and other advantages of the present invention will become more apparent by describing in detail the preferred embodiment of the present invention with reference to the attached drawings in which:

FIG. 2 is a plan view of the tape player according to the present invention and FIGS. 2A and 2B are enlarged perspective views of the cicled portions in FIG. 2;

DETAILED DESCRIPTION OF THE PREFERRED EMBODIMENT

Figure 2:
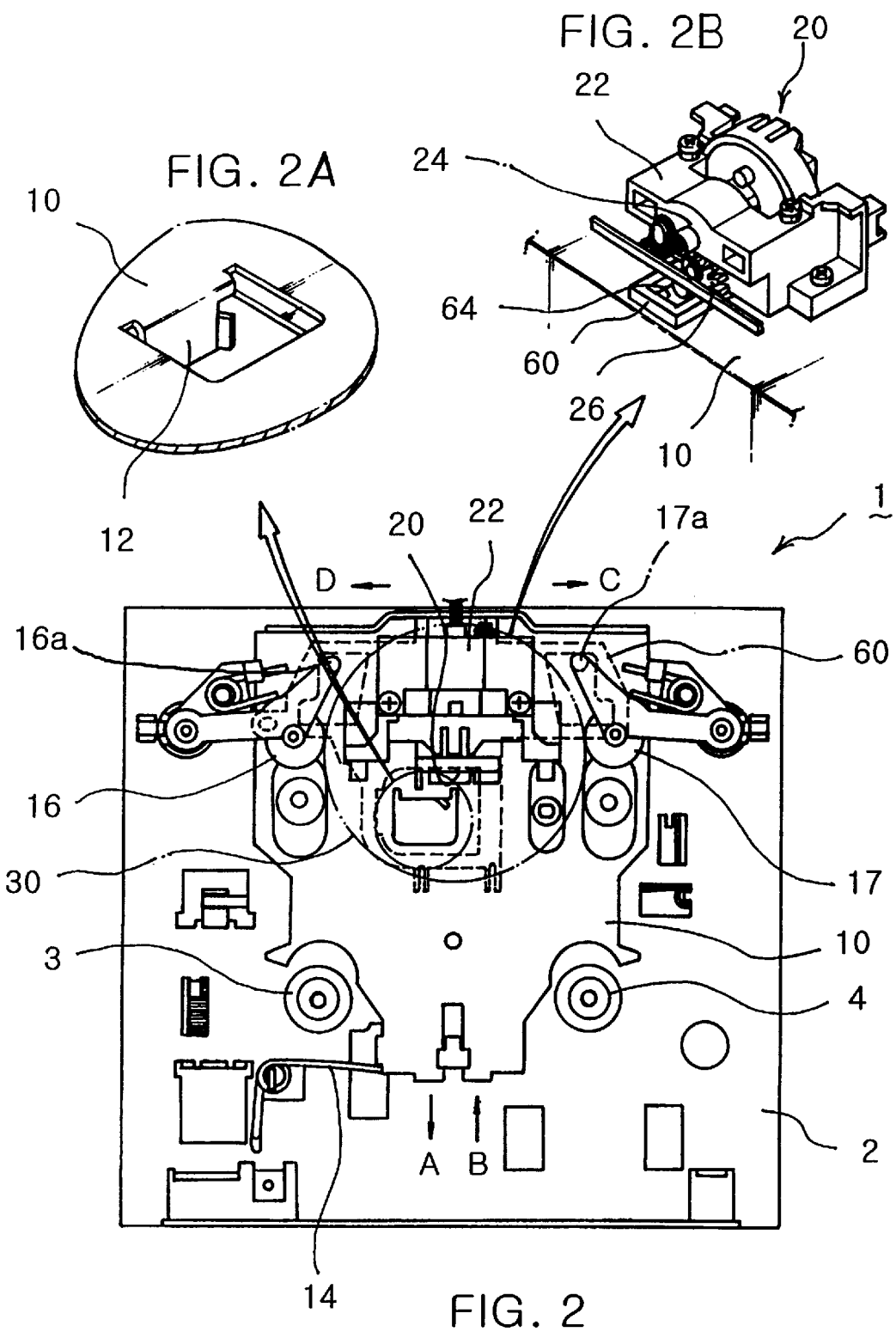
Figure 3:
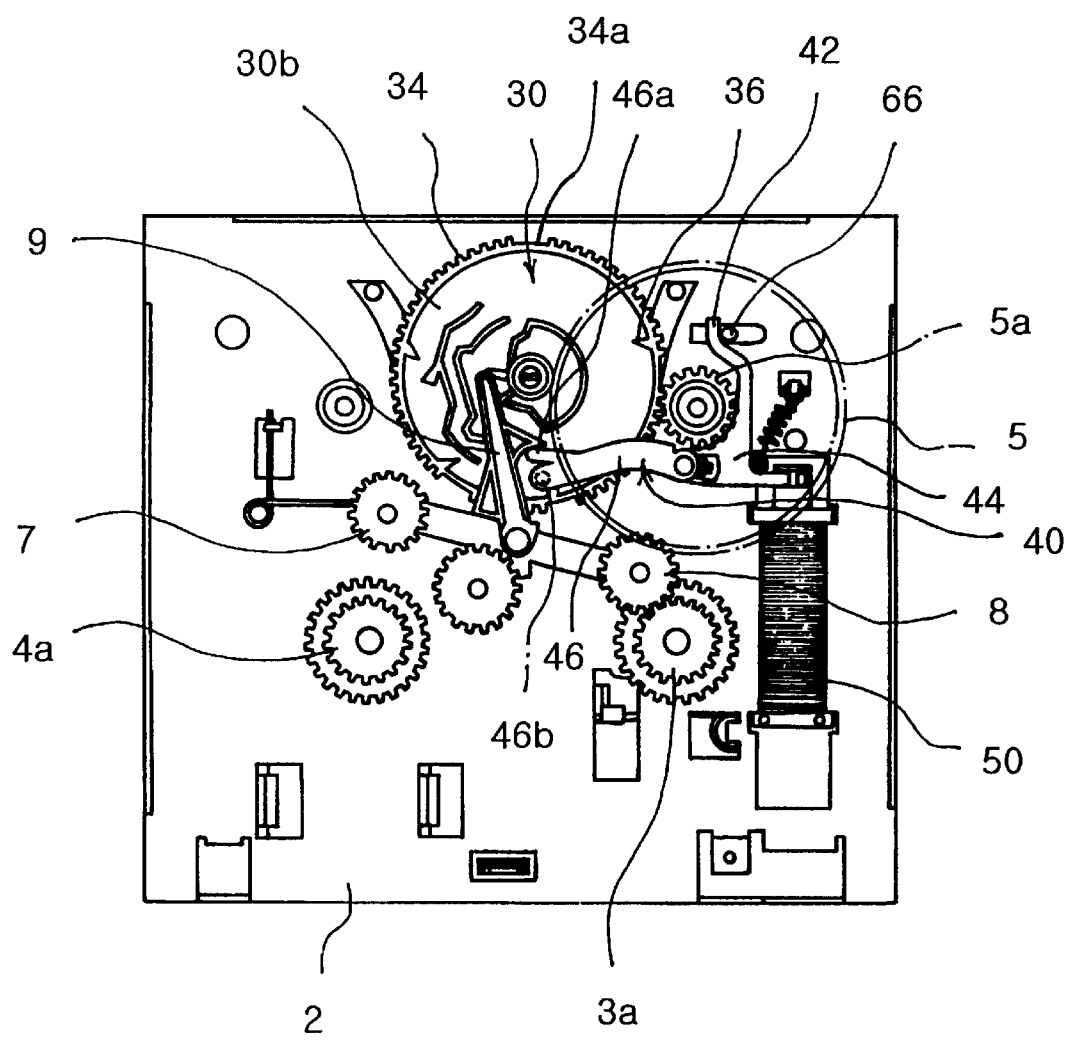
FIG. 3 is a bottom view of the tape player according to the present invention.

FIGS. 2 and 3 illustrate the overall constitution of the tape player according to the present invention. As shown in these drawings, the revolutions of the tape reel are carried out by capstans 3 and 4 which are installed mutually facingly at both sides of a chassis 2 of the tape player 1. The capstans 3 and 4 are meshed with a cam gear 30 which drives driving gears 3a and 4a (installed beneath the chassis 2) through a fly wheel 5, and are meshed with connection gears 7 and 8 which are connected in accordance with the actuation modes.

Meanwhile, above the chassis 2, there is installed a head base 10 which is movable back and forth in the directions of A and B of FIG. 2. A magnetic head 20 which is installed at the rear of the head base 10 and upon a support 22 moves to carry out normal, reverse and play modes. The magnetic head 20 is of a switching type, which rotates by 180° in accordance with the normal and reverse modes, but this magnetic head 20 will be further described later.

Figure 4:
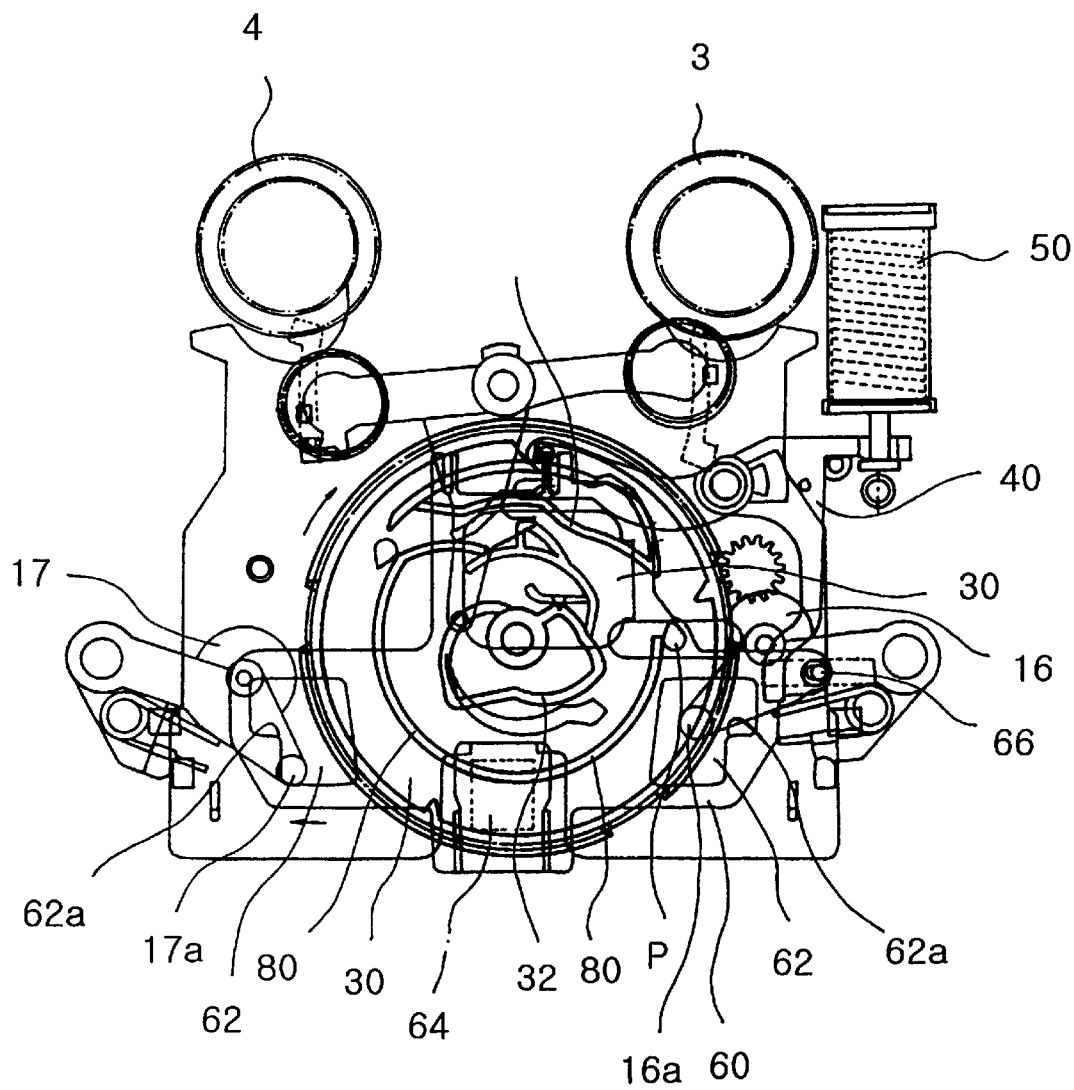
FIG. 4 illustrates the structure of the mode shifting device for the tape player according to the present invention.

Further, as shown in FIGS. 2 and 4, the back-and-forth movements of the head base 10 are effected by a head cam 32 which is installed at the center of the top of the cam gear 30 which revolves beneath the head base 10. As shown in the detailed illustration of FIG. 2, a contact piece 12 which passes through the chassis 2 at the center of the head base 10 contacts with the head cam 32 of the cam gear 30, and thus, the contact piece 12 moves back and forth in accordance with the contour of the head cam 32.

That is, as shown in FIGS. 2 and 4, when the contact piece 12 moves to the protruded end of the head cam 32, the contact piece 12 is separated from the center of the head cam 32. Therefore, the head base 10 moves forward to carry out the play mode. On the other hand, if contact piece 12 enters into the recessed portion of the head cam 32, then the head base 10 moves backward to carry out the normal mode. The head base 10 is elastically installed with a spring 14, and therefore, it is always pulled toward the front (in the direction A of FIG. 2).

Further, as shown in FIG. 3, a teeth portion 34 of the cam gear 30 is meshed with a teeth portion 5a of a fly wheel 5 which is driven by a motor (not illustrated), so as to be revolved. A non-toothed portion 34a on which teeth are not formed makes the power of the fly wheel 5 not transmitted. In this state, the tape player 1 is put the play mode or to the normal mode, in which the driving power of the cam gear 30 is not needed.

Further, As shown in FIG. 2, pinch rolls 16 and 17 are installed at both sides of the chassis 2 and at both sides of the head base 10. The pinch rolls 16 and 17 moves back and forth to guide the tape in accordance with the shifting of the modes. Further, actuation pieces 16a and 17a are installed at both sides of the pinch rolls 16 and 17, while a mode shifting lever 60 is installed between the head base 10 and the chassis 2 so as to move to left and right (in the direction C and D).

As shown in FIGS. 3 and 4, the shifting lever 60 is provided with an actuation opening 64 and a pair of a cut holes 62 at its center and at both sides respectively. Inside each of the cut holes 62, there is projected a stopper 62a. Owing to these stoppers 62a, the actuation pieces 16a and 17a of the pinch rolls 16 and 17 are intermittently driven during the lateral movements of the shifting lever 60.

Ultimately, an actuation arm 66 which passes through the chassis 2 at a side of the shifting lever 60 is intermittently driven by the actuation arm 42 of the locking lever 40. If this occurs, the actuation arms 16a and 17a of the pinch rolls 16 and 17 are guided by the stoppers 62a of the shifting lever, and thus, the pinch rolls 16 and 17 are moved in accordance with the normal and reverse modes.

Further, as shown in the detailed illustration of FIG. 2, the lower portion of a shifting gear 26 which is meshed with a rear revolution shaft gear portion 24 of the magnetic head 20 is guided into the central actuation opening 64 of the shifting lever 60. Therefore, during the lateral movements of the shifting lever 60, the magnetic head 20 rotates by 180° in accordance with the normal and reverse modes. If it moves to right (the direction C of FIG. 2), it becomes to the normal mode, while if it moves to left (in the direction D of FIG. 2), then it becomes the reverse mode.

Meanwhile, as shown in FIG. 3, the locking lever 40 includes: an actuation arm 42 pin-secured to under the chassis 2, and interlocked to the actuation arm 66 of the shifting lever 60; a pivotable arm 44 installed under the chassis 2, for being intermittently driven by a solenoid 50; a stopper 46b for being engaged with one of protuberances 36 of the cam gear 30; and a locking arm 46 having a protuberance 46a for being connected to a gear arm 9 for driving the connection gears 7 and 8.

Figure 5:
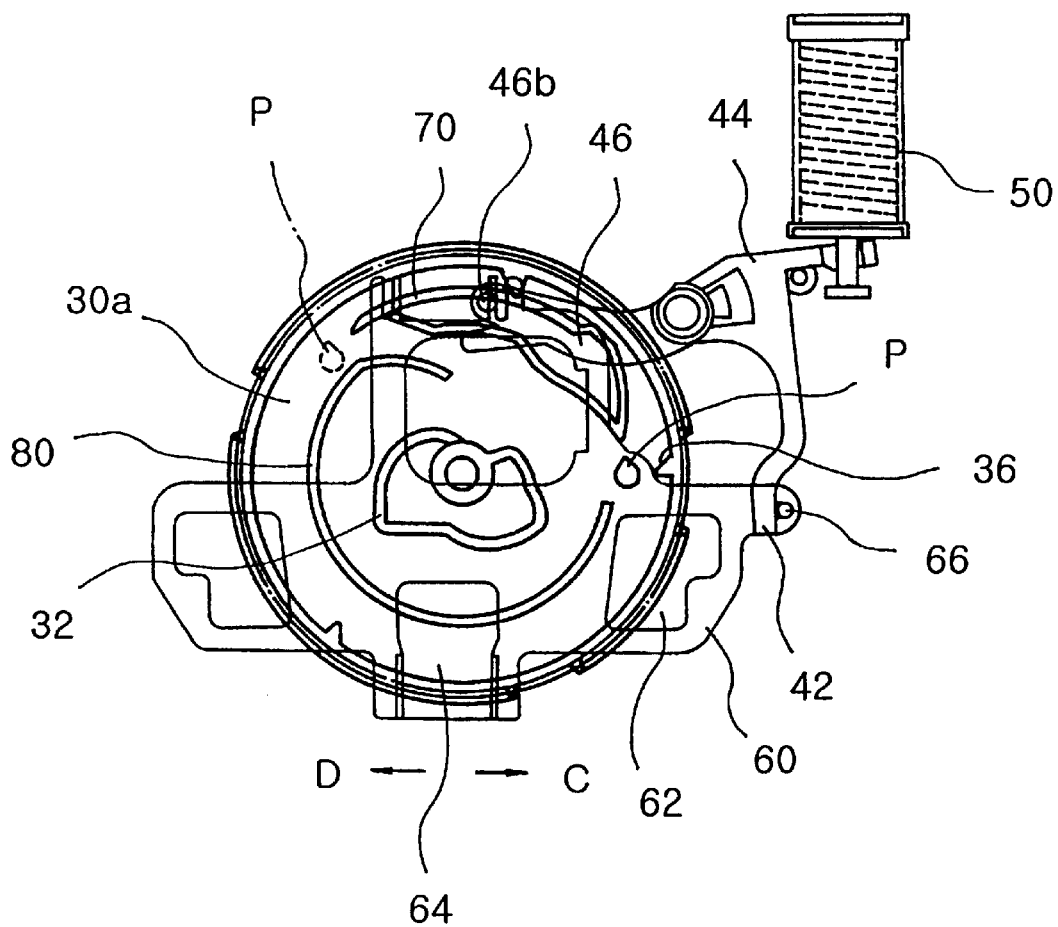
FIG. 5 is a plan view of a critical portion of the mode shifting device according to the present invention.

As shown in FIGS. 4 and 5, the shifting lever 60 is provided with a mode shifting guide pin P which passes through the chassis 2. The guide pin P moves along a guide means 80 and a branching cam 70 which is installed adjacently to the head cam 32 of the cam gear 30.

Figure 6:
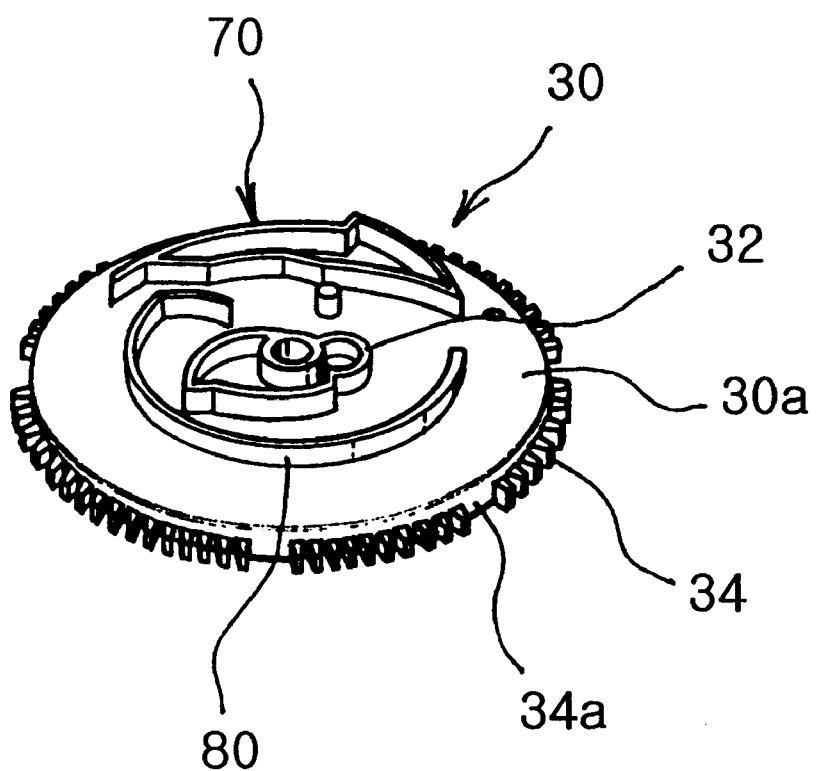
FIG. 6 is a perspective view of the cam gear used in the mode shifting device according to the present invention.
Figure 7:
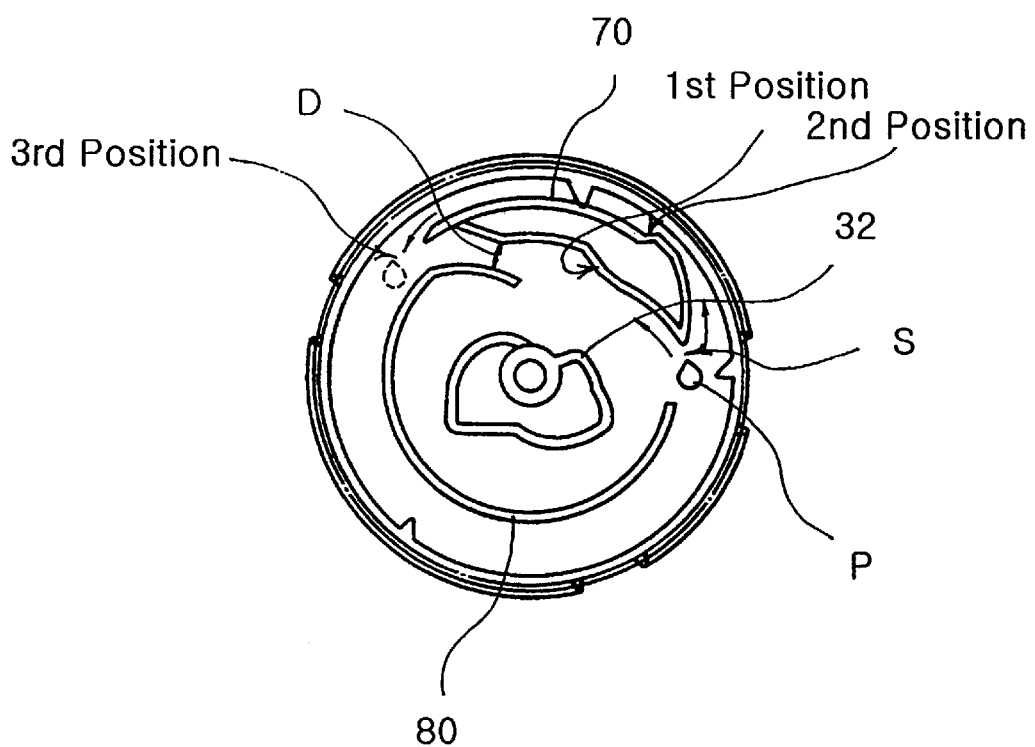
FIG. 7 is a plan view showing the cam actuation in the mode shifting device according to the present invention.

Therefore, as shown in FIGS. 3, 6 and 7, if the head base 10 advances to a predetermined position, the teeth portion 34 of the cam gear 30 is meshed with the teeth portion 5a of the fly wheel 5. Thus when the power of the fly wheel 5 is transmitted, the actuation arm 42 of the locking lever 40 is pulled owing to the solenoid 50. Thus the pivotable arm 44 is pivoted, and the stopper 46b of the locking arm 46 departs from the securing protuberance 36 of the cam gear 30, with the result that the cam gear 30 is driven. Accordingly, the guide pin P of the shifting lever 60 moves from a starting point S of the branching cam 70 to a first or second position of the branching cam 70 owing to the solenoid 50.

Here, the normal mode is carried out at the first position, while the reverse mode is carried out at the second position. That is, if the actuation time of the solenoid 50 is short, the guide pin P moves to the first position of the branching cam 70, while if the actuation time is long, the guide pin P moves to the second position of the branching cam 70. That is, the advancing path of the guide pin P of the shifting lever 60 is decided by the time difference of pulling the actuation arm 66 of the shifting lever 60 by the actuation arm 42 of the locking lever 40 by being driven by the solenoid 50.

Owing to such a branching function, the shifting lever 60 moves either to left or to right (in the direction C or D of FIG. 2). By the movements of the shifting lever 60, the magnetic head together with the pinch rolls 6 and 7 is shifted to the normal, reverse or play mode.

Meanwhile, as shown in FIGS. 6 and 7, if the guide pin P of the shifting lever 60 advances to the first or second position along the branching cam 70 of the cam gear 30, then the stopper 46b of the locking lever 40 is engaged with the securing protuberance 36 of the cam gear 30 to maintain a fixed state, thereby making it possible to repeat the normal and reverse modes.

Under this condition, if the solenoid 50 is activated again, then the stopper 46b of the locking lever 40 departs from the securing protuberance 36 of the cam gear 30. Accordingly, the locked state is released, and the cam gear 30 revolves in accordance with the advancement of the head base 10 by the help of the elastic force of the spring 14 as shown in FIG. 2, with the result that the guide pin P of the shifting lever 60 quickly moves to the third position (FIG. 7).

Figure 1:
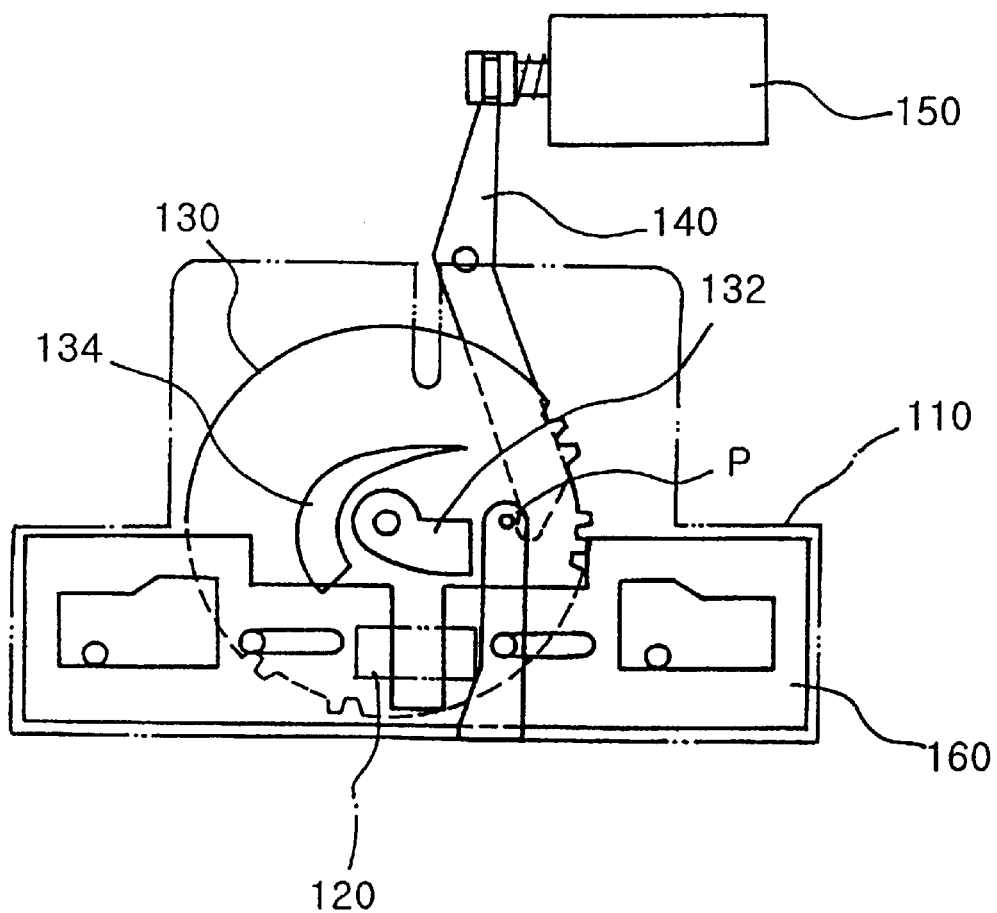
FIG. 1 is a schematic plan view showing a conventional mode shifting device for a tape player.

That is, in the conventional device as shown in FIG. 1, the guide pin P is moved to the first or second position (the normal or reverse mode) by the branching cam 134 of the rotor 130. Then the guide pin P moves along the separate guide cams in accordance with the normal or reverse mode, thereby carrying out the play mode. In contrast to this, in the present invention, as shown in FIGS. 6 and 7, the guide pin P of the shifting lever 60 quickly moves along the guide means in the form of a single cam, regardless of the normal and reverse modes. Therefore, the shifting actuation can be more quickly carried out in the present invention compared with the conventional device.

The guide means 80 consists of a single cam as described above, and therefore, compared with the conventional device, the constitution of the cam gear 30 can be simplified, and the shifting actuation can be carried out more quickly, thereby improving the shifting function of the tape player.

As shown in FIG. 7, the guide means 80 has an arcuate starting portion starting from the end of the first position of the branching cam 70, and extends to the branching point of the branching cam 70. Thus the guide pin P is made ready for being quickly shifted to the play mode. Here, the guide means 80 has a distance D up to the branching cam 70, and the distance D is slightly larger than the guide pin P which passes through the, distance D.

Accordingly, the structure of the cam gear 30 which shifts the tape player to the normal or reverse mode is simplified, and the shifting actuation to the play mode is more quickly carried out.

Figure 8:
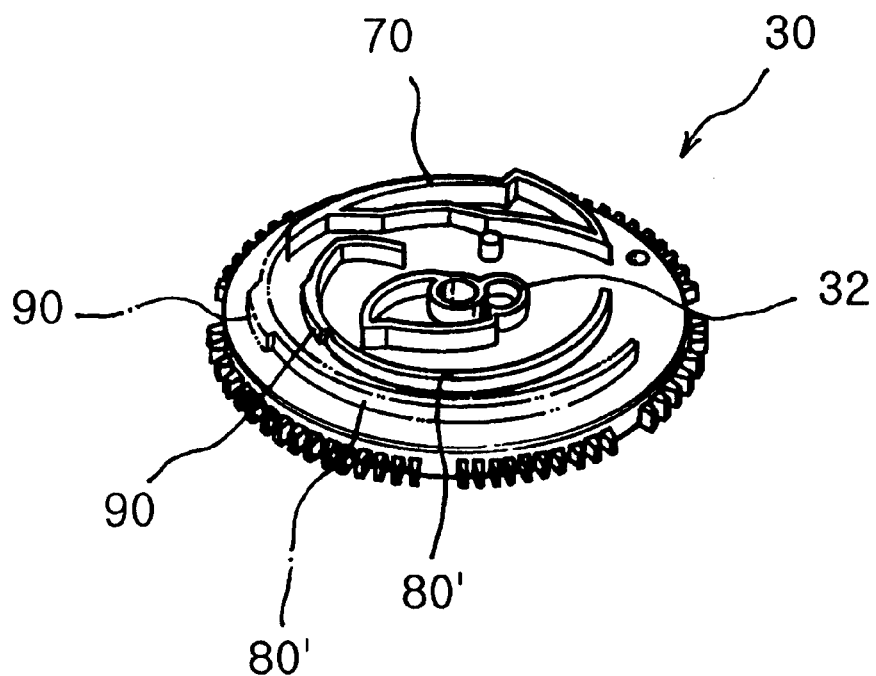
FIG. 8 is a perspective view of a cam gear used in another embodiment of the mode shifting device according to the present invention.

FIG. 8 illustrates another embodiment of the tape player 1 according to the present invention. The major feature of this second embodiment is that a guide projection 90 is formed on a side of the guide means 80' which makes the guide pin P of the shifting lever 60 advance to the third position during the selection of the normal or reverse mode.

That is, regardless of the number of the guide means 80' which is decided by the normal and reverse modes, the gap between the actuation arm 66 of the shifting lever 60 and the actuation arm 42 of the locking lever 40 after carrying out the normal or reverse mode is decided by the height of the guide projection 90 in accordance with the displacements of the guide pin P of the shifting lever 60.

Therefore, if the guide pin P of the shifting lever 60 arrives at the guide projection 90 after moving along the guide means 80', then a gap as big as the height of the guide projection 90 is formed between the actuation arms 42 and 66 of the locking lever 40 and the shifting lever 60. As a result when the solenoid 50 actuates for moving the shifting lever 60 under a locked state of the locking lever 40, the actuation load of the solenoid 50 is alleviated, its operation is improved, and its life expectancy is extended, owing to the gap.

According to the present invention as described above, the cam structure of the cam gear which effects the shifting by a single driving motor is simplified, thereby making the manufacture easier.

Further, during the revolutions of the cam gear, the tape player can be quickly shifted to the play mode from the normal or reverse mode, thereby making it possible to shift the tape player quickly.

Further, the actuation load of the solenoid is alleviated, and therefore, the intermittent driving of the locking lever and the shifting lever by the solenoid is made efficient. Accordingly, the life expectancy of the solenoid is extended, and the shifting actuation becomes more efficient.

In the above, the present invention was described based on the specific embodiments, but it should be apparent to those ordinarily skilled in the art that various changes and modifications can be added without departing from the spirit and scope of the present invention.

What is claimed is:

1. A mode shifting device for a tape player, comprising:
   a head base 10 for carrying a magnetic head 20;
   a cam gear 30 rotatably installed for carrying said head base 10;
   a locking lever 40 for locking said cam gear 30 during an advancement of said head base 10 to a certain point, so as to carrying out a mode actuation;
   a solenoid 50 for intermittently driving said locking lever 40;
   a shifting lever 60 for carrying out a direction reversal in accordance with intermittent actuations of said locking lever 40; and
   a guide means 80 for branching a path of said shifting lever 60 to a third position along a side of a branching cam 70 so as to make said shifting lever 60 move to a first or second position during a driving of said cam gear 30, whereby a quick shifting to a play mode is carried out.

2. The mode shifting device as claimed in claim 1, wherein said guide means 80 effects a quick shifting to the play mode regardless of the normal or reverse mode.

3. The mode shifting device as claimed in claim 2, wherein said guide means 80 consists of an independent single cam.

4. The mode shifting device as claimed in claim 3, wherein said guide means 80 has an arcuate shape starting from an end of a first position of said branching cam 70.

5. The mode shifting device as claimed in claim 3, wherein said guide means 80 extends to a branching point S.

6. The mode shifting device as claimed in claim 3, wherein between said guide means 80 and said branching cam 70, there is a gap D.

7. A mode shifting device for a tape player, comprising:
   a head base 10 for carrying a magnetic head 20;
   a cam gear 30 rotatably installed for carrying said head base 10;
   a locking lever 40 for locking said cam gear 30 during an advancement of said head base 10 to a certain point, so as to carrying out a mode actuation;

a solenoid 50 for intermittently driving said locking lever 40;

a shifting lever 60 for carrying out a direction reversal in accordance with intermittent actuations of said locking lever 40; and at least a guide means 80' installed at a side of a branching cam 70 so as to make said shifting lever 60 move to a first or second position during a driving of said cam gear 30, for carrying out a play mode, said guide means 80' having a guide projection 90.

8. The mode shifting device as claimed in claim 7, wherein said guide means 80' consists of a single independent cam having a third position, for branching a path of a guide pin P of said shifting lever 60, so as to quickly shift the tape player to the play mode regardless of the normal or reverse mode.

9. The mode shifting device as claimed in claim 7, wherein said guide projection 90 of said guide means 80' forms a certain gap between said locking lever 40 and said shifting lever 60 to alleviate an actuation load of said solenoid 50, said guide projection 90 being formed integrally with said guide means 80'.

10. The mode shifting device as claimed in claim 9, wherein said guide projection 90 has a proper projection height so as not to give any influence when said magnetic head 20 carries out the play mode.

* * * * *